United States Patent [19]
Yamamoto et al.

[11] Patent Number: 5,182,463
[45] Date of Patent: Jan. 26, 1993

[54] 3-PHASE CONVERTER APPARATUS

[75] Inventors: Yuushin Yamamoto; Nobuo Sashida; Yuuko Yamasaki; Takao Kawabata, all of Kobe, Japan

[73] Assignee: Mitsubishi Denki Kabushiki Kaisha, Tokyo, Japan

[21] Appl. No.: 543,478

[22] Filed: Jun. 26, 1990

[30] Foreign Application Priority Data

Jun. 29, 1989 [JP] Japan ................................ 1-165399

[51] Int. Cl.⁵ .......................... H02J 3/32; H02M 3/24
[52] U.S. Cl. ....................................... 307/46; 363/95; 363/98; 307/56
[58] Field of Search ............... 307/45, 46, 44, 48, 307/52, 55, 56, 64–66, 85–87, 125–127; 363/95, 98, 207

[56] References Cited

U.S. PATENT DOCUMENTS

| | | | |
|---|---|---|---|
| 4,510,400 | 4/1985 | Kiteley | 307/66 |
| 4,652,770 | 3/1987 | Kumano | 307/66 |
| 4,719,557 | 1/1988 | Forstbauer et al. | 363/79 |
| 4,823,251 | 4/1989 | Kawabata et al. | 363/95 |
| 4,878,208 | 10/1989 | Seki et al. | 307/45 |

OTHER PUBLICATIONS

"New Conversion System for UPS Using High Frequency Link", Yamoto et al., PESC '88 Record, Apr., 1988.
"One Type of Power-Failure Free Power Supply System" with English translation, all Japanese Lecture Conference of the Association of Electronic Engineering, 1977, pp. 864–865.
"Three Phase Parallel Processing UPS Using Multi-Functional Inverter" Takao Kawabata, Nobuo Sashida, et al.; Conference Record of the 1989 IEEE Industry Applications Annual Meeting.
"UPS Systems Using Multi-Functional Inverters", T. Kawabata, N. Sashida, et al.; Intelec 87 Conference Proceedings; Sheraton Stockholm Hotel; Stockholm, Jun. 14–17, 1987.

Primary Examiner—A. D. Pellinen
Assistant Examiner—Richard T. Elms
Attorney, Agent, or Firm—Leydig, Voit & Mayer

[57] ABSTRACT

A 3-phase converter apparatus, in which a 3-phase A.C. power supply and a 3-phase converter operate in parallel on a common load BUS so as to share the load power, has an output voltage command generating device for generating an instantaneous command of the output voltage from the converter, and instantaneous voltage control device for controlling the converter so as to reduce the deviation of the instantaneous value of the output voltage of the converter from the instantaneous command generated by the output voltage command generating device. The converter includes at least one semiconductor switch for effecting a plurality of switching cycles in a half cycle of the A.C. power, so that the control of the phase of the output voltage of the converter with respect to the A.C. power supply is started at any moment.

15 Claims, 12 Drawing Sheets

3-PHASE CONVERTER APPARATUS

BACKGROUND OF THE INVENTION

1. Field of the Invention

The present invention relates to a 3-phase converter apparatus and, more particularly, to a 3-phase converter apparatus which is operated in parallel with an A.C. power supply and capable of maintaining the voltages of load BUS lines at desired values of sine-wave curves.

2. Description of the Related Art

Inverters have been typically used as the 3-phase converter apparatus of the kind described. In general, however, inverters are difficult to be controlled and are not fully analyzed theoretically and, therefore, 3-phase converter devices using inverters have not been put to practical use.

FIG. 10 is a block diagram of a known conversion apparatus of the type disclosed in an article "One Type of Power-Failure Free Power Supply System" in a gazzette of All Japan Lecture Conference of the Association of Electronic Engineering. 1977, pp 864-865. Referring to this Figure, the converter apparatus includes an inverter 1 for converting D.C. power into A.C. power. An A.C. power supply 2 is operated in parallel with the inverter 1 so as to produce a sine-wave A.C. power source voltage. Numeral 3 denotes a load. The converter apparatus further includes a storage battery 4 for supplying a D.C. power source voltage $V_D$, an inductor 5 and a capacitor 6 which in cooperation form a low-pass filter for allowing low-frequency component of the output of the inverter 1 to pass therethrough, an inductor 7 connected between the A.C. power supply 2 and the load 3 and having a 15% induction component, and load BUS lines 8 through which the A.C. power supply 8 and the inverter 1 are respectively connected to the load 3 so as to apply BUS voltage $V_c$ to the load 3. The components mentioned above form a main circuit of the known converter apparatus.

The converter apparatus further includes a control circuit which has the following components: a current detecting circuit 103 for detecting the charging current supplied from the inverter 1 to the storage battery 4; a voltage detecting circuit 104 for detecting the BUS voltage $V_c$; a voltage detecting circuit 106 for detecting the voltage $V_D$ of the storage battery 4; a phase differential detecting circuit 204 for detecting the phase differential $\Delta\phi$ between the A.C. source voltage $V_B$ and the output of the inverter 1; a voltage setting circuit 304 which provides a reference value for controlling the voltage of the inverter 1; and a voltage control amplifier 601 connected to the voltage setting circuit 304 and the voltage detection circuit 104 through a subtracting device 402. The voltage control amplifier 601 is capable of controlling the voltage of the inverter 1 in accordance with the difference between the reference value derived from the voltage setting circuit 304 and the BUS voltage $V_c$ detected by the voltage detection circuit 104.

The control circuit further includes: a voltage setting circuit 312 for outputting the set value of the battery voltage $V_D$; a voltage control amplifier 311 connected to the voltage setting circuit 312 and the voltage detecting circuit 106 through a subtracting device 406, the voltage control amplifier 311 being capable of producing a current command value for determining the charging current for charging the storage battery 4 in accordance with the difference between the st value of the voltage from the voltage setting circuit 312 and the storage battery voltage $V_D$; a current control amplifier 310 connected to the voltage control amplifier 311 and the current detecting circuit 103 through a subtracting device 405, the current amplifier 310 being capable of delivering a phase differential command $\phi_{REF}$ in accordance with the difference between the current command from the voltage control amplifier 311 and the value detected by the current detecting circuit 103; and a PLL amplifier 205 connected to the current control amplifier 310 and the phase differential detecting circuit 204 through a subtracting device 404; and an oscillator 600 connected the PLL amplifier 205. The PLL amplifier 205 and the oscillator 600 in cooperation form a phase synchronizing loop circuit. The PLL amplifier 205 amplifies the difference between the phase differential $\Delta\phi$ detected by the phase differential detecting circuit 204 and the phase differential command $\phi_{REF}$ derived from the current amplifier 310. The oscillation output frequency of the oscillator 600 is controlled in accordance with the output from the PLL amplifier 205 so as to deliver a control signal to the inverter 1, thus effecting a feedback control of the inverter 1.

The conventional converter apparatus has the described construction and operates in a manner which will be explained hereinunder. Referring to the main circuit, the D.C. voltage $V_D$ from the storage battery 4 is converted into A.C. power by means of the inverter 1 the output of which is made to pass through the low pass filter formed by the inductor 5 and the capacitor 6 so that higher-harmonic components are removed from this output. The A.C. power supply 2 is connected to the load BUS 8 through the inductor 7 so that an effective power proportional to sin $\Delta\phi$ is supplied to the load BUS 8, the factor $\Delta\phi$ representing the phase differential between the A.C. source voltage $V_B$ and the BUS voltage $V_c$. This effective power is equal to the sum of the effective power demanded by the load 3, power for charging the storage battery 4 and the loss in the inverter 1.

On the other hand, the control circuit operates in a manner which will be explained hereinunder. The phase differential detecting circuit 204 detects the phase differential $\Delta\phi$ between the A.C. source voltage $V_B$ and the output voltage of the inverter 1 and the phase differential $\Delta\phi$ is fed back to the phase synchronizing loop circuit composed of the PLL amplifier 205 and the oscillator 600. The voltage control amplifier 311 delivers a command of the charging current for charging the storage battery 4 in accordance with the difference between the voltage $V_D$ of the storage battery 4 detected by the voltage detecting circuit 106 and the set value of voltage set by the voltage setting circuit 312. The current control amplifier 310 computes the phase differential command $\phi_{REF}$ in accordance with the difference between the current command and the value detected from the current detecting circuit 103, and delivers this command $\phi_{REF}$ to the PLL amplifier 205.

Thus, the operation phase of the inverter 1 is suitably delayed by the A.C. source voltage $V_B$. Meanwhile, the storage battery 4 is charged constantly at the set voltage set by the voltage setting circuit 312, so that the effective power demanded by the load 3 is supplied from the A.C. power supply 2.

In the arrangement shown in FIG. 10, the operation phase of the inverter 1 fed back from the phase difference detecting circuit 204 is derived from the output of the inverter 1. This, however, is only illustrative and the arrangement may be such that the terminal voltage across the capacitor 6 is delivered to the phase differential detecting circuit 204. This is because the voltage across the capacitor 6 exhibits substantially the same behavior as the output of the inverter 1.

The voltage control amplifier 601 controls the output voltage of the inverter 1 in accordance with the differential between the set voltage set by the voltage setting circuit 304 and the BUS voltage $V_c$ of the BUS line 8 detected by the voltage detecting circuit 104. This control, however, is a control based upon the mean value of the voltage.

The known converter apparatus having the described construction, however, suffers from the following problems.

1) The conventional converter apparatus is designed to control the mean value of the output voltage so that it is difficult to quickly change the phase of the output voltage of the inverter 1 in response to a quick change in the load power. More specifically, a time corresponding to several cycles is required for the response. In the meantime, the storage battery 4 is charged or made to discharge so that a change is caused in the quantity of electricity charged in the storage battery 4.

2) The BUS voltage $V_c$ is controlled on the basis of the mean value of the voltage, so that a strain is caused in the BUS voltage $V_c$ particularly when the load is of the type which contains many higher harmoinics as is the case of a rectifier.

3) In general, the inverter 1 is a voltage-type inverter which, by virtue of a filter, produces a sine-wave voltage. The inverter, therefore, is not resistant to eddy current so that an excessively large cross current is generated when, for example, the A.C. power voltage is changed drastically, often resulting in an inversion failure of the inverter.

4) In the known art as described, all the phases are equally controlled even when unbalance of load and source voltage exists between the phases, so that it is impossible maintain balance of the three phases.

SUMMARY OF THE INVENTION

Accordingly, an object of the present invention is to provide a 3-phase converter apparatus which can ensure a correct operation of an inverter without causing a strain in the BUS voltage and even when the load is charged quickly, thereby overcoming the above-described problems of the prior art.

To this end, according to the present invention, there is provided a 3-phase converter apparatus in which a 3-phase A.C. power supply and a 3-phase converter operate in parallel on a common load BUS so as to share the load power, the apparatus comprising: output voltage command generating means for generating an output voltage command of the output voltage from the converter the means computing an optimum phase deviation of a local BUS voltage from the A.C. power supply and determining the output voltage command in accordance with a computed value of the optimum phase deviation; and instantaneous voltage control means for controlling the converter so as to reduce the deviation of the instantaneous value of the output voltage of the converter from the output voltage command generated by the output voltage command generating means.

The above and other objects, features and advantages of the present invention will become clear from the following description of the preferred embodiment when the same is read in conjunction with the accompany drawings.

DESCRIPTION OF THE PREFERRED EMBODIMENTS

Figure 1:
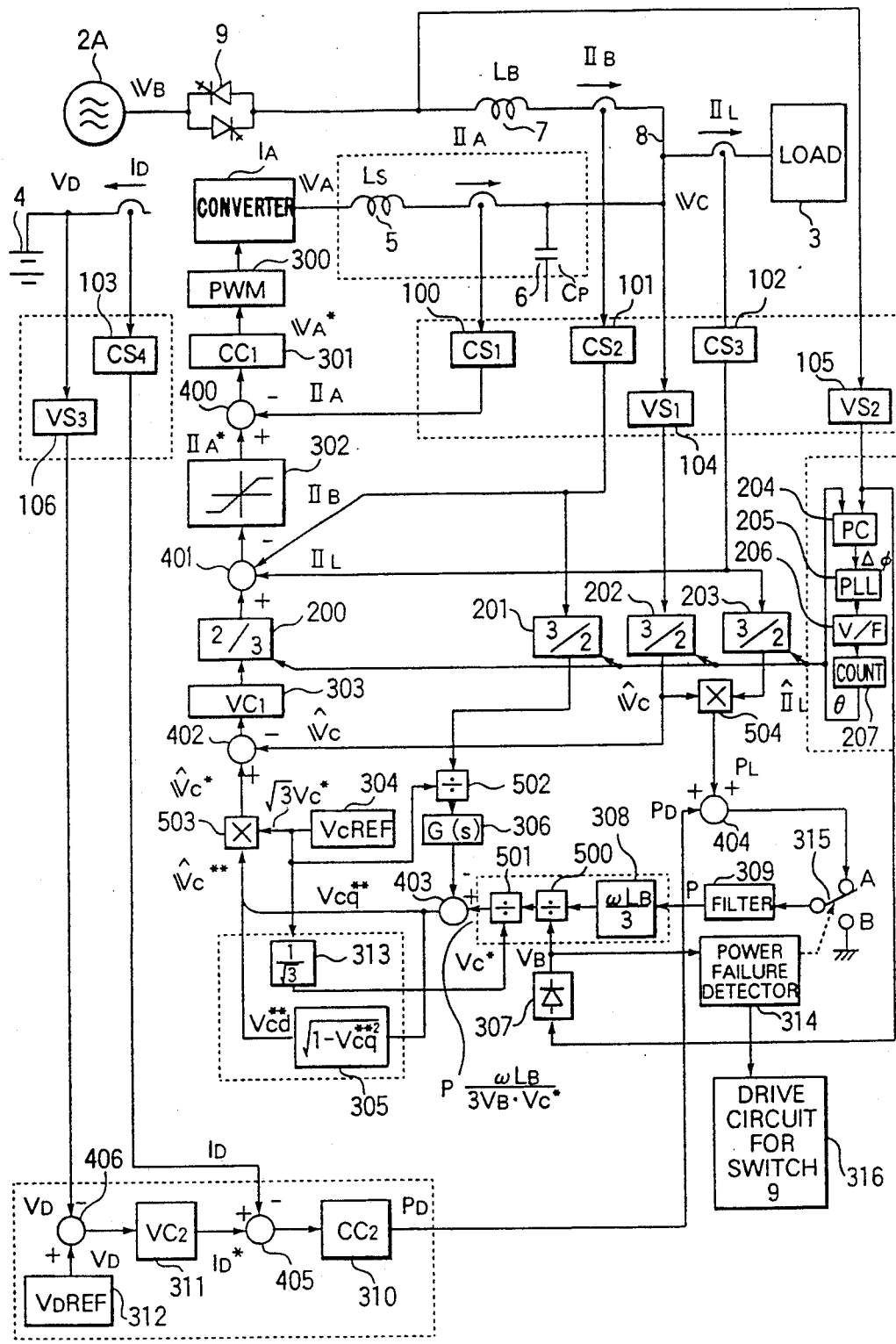
FIG. 1 is a circuit diagram showing the construction of an embodiment of the apparatus in accordance with the present invention.

Referring to FIG. 1, an embodiment of the 3-phase converter apparatus of the present invention includes an inverter 1A which is of high-frequency PWM (Pulse Width Modulation) type having a full-bridge connection of, for example, high-frequency switching elements and capable of converting a D.C. power to a 3-phase A.C. power $V_A$ and $I_A$. A load 3 is connected, through a static switch 9, an inductance 7 and load BUS 8, to a 3-phase A.C. power supply 2A capable of supplying a 3-phase A.C. power $V_B$, $I_B$. The static switch 9 is adapted to forcibly disconnect the A.C. power supply 2A and the inductance 7 in the event of a failure of the A.C. power supply 2A. A storage battery 4 for supplying power to the load 3 in the event of a failure in the 3-phase A.C. power supply 2A is connected to the input side of the inverter 1A. Between the output of the inverter 1A and the load BUS 8 are connected an inductor 5 and a capacitor 6 which in cooperation provide an A.C. filter for removing higher harmonics from the output $V_A$, $I_A$ of the inverter 1A. These components form a main circuit of this embodiment.

In FIG. 1, the lines of the 3-phases are collectively represented by a single line. This invention, however, pertains to conversion of 3-phase A.C. power, and therefore, voltages and currents are represented by vectors in the following description. Definition of the vectors will be explained in the description. Symbols used in the foregoing description represent the following voltages and currents:

$$|V_A = \begin{bmatrix} V_{AU} \\ V_{AV} \\ V_{AW} \end{bmatrix} : \text{inverter output voltage}$$

$$|I_A = \begin{bmatrix} I_{AU} \\ I_{AV} \\ I_{AW} \end{bmatrix} : \text{inverter output current}$$

$$|V_B = \begin{bmatrix} V_{BU} \\ V_{BV} \\ V_{BW} \end{bmatrix} : \text{3-phase A.C. source voltage}$$

$$|I_B = \begin{bmatrix} I_{BU} \\ I_{BV} \\ I_{BW} \end{bmatrix} : \text{3-phase A.C. source current}$$

$$|I_L = \begin{bmatrix} I_{LU} \\ I_{LV} \\ I_{LW} \end{bmatrix} : \text{load current}$$

$$|V_C = \begin{bmatrix} V_{CU} \\ V_{CV} \\ V_{CW} \end{bmatrix} : \text{load BUS voltage}$$

$V_D$: storage battery voltage $I_D$: storage battery charge current where, suffixes $u$, $v$, $w$ represent the respective phase of the 3-phase A.C. power.

The above-described main circuit is controlled by a control circuit having the following features. Referring to FIG. 1, the control circuit includes a 3-phase current detecting circuit 100 coupled to an A.C. filter on the output side of the inverter 1A and capable of detecting the output current $I_A$ from the inverter. A 3-phase current detecting circuit 101 is connected to the load BUS 8 and is capable of detecting the A.C. source current $I_B$ from the 3-phase A.C. power supply 2A. A 3-phase current detecting circuit 102 is connected to the input side of the load 3 so as to detect the instantaneous value of the load current $I_L$ flowing into the load 3. Numeral 103 denotes a battery charging current detecting circuit coupled to the output side of the storage battery 4 and capable of detecting the battery charging current $I_D$. 3-phase voltage detecting circuits 104 and 105 are connected to the load BUS 8 and the input of the inductor 7 so as to detect the instantaneous values of the load BUS voltage $V_C$ and the 3-phase A.C. source voltage $V_B$. A storage battery voltage detecting circuit 106 is connected to the output of the storage battery 4 so as to detect the storage battery voltage $V_D$.

The voltages and currents detected in the main circuit described above are 3-phase voltages and 3-phase currents. In this embodiment, for the convenience's sake in computation performed in the control circuit, the voltage and the current are converted from the 3-phase to 2-phase of a (d−q) 2-axes coordinate system and, after a computation, converted again into 3-phase. To this end, the control circuit employs 3-phase/2-phase conversion circuits 201, 202 and 203 which are connected to the 3-phase current detecting circuit 101, 3-phase voltage detecting circuit 104 and the 3-phase current detecting circuit 102 so as to effect the conversion from 3-phase voltage or current to 2-phase voltage or current, and a 2-phase/3-phase conversion circuit 200 for effecting conversion from the 2-phase to the 3-phase voltage or current.

A phase differential detecting circuit 204 is capable of detecting the phase differential $\Delta\Phi$ between the phase of the A.C. source voltage $V_B$ detected by the 3-phase voltage detecting circuit 105 and a count value $\theta$ generated by a counter 207 and used as a synchronizing signal. Numeral 205 denotes a phase synchronizing circuit composed of an amplifier which is mainly of proportional/integrating type and capable of amplifying the phase differential $\Delta\Phi$ detected by the phase differential detecting circuit 204. A voltage/frequency conversion circuit 206 is capable of producing a signal of a frequency having dependency on the output signal of the phase synchronizing circuit 205. The counter 207 mentioned above is capable of dividing the signal from the voltage/frequency conversion circuit 206 and delivering it as the counted value $\theta$. The phase synchronizing circuit 205 is adapted to operate such that the phases of the 3-phase A.C. power supply 2A are synchronous with the counted value $\theta$. Therefore, the counted value $\theta$ from the counter 207 corresponds to the phases of the 3-phase A.C. power source 2A. By determining the time base of the 3-phase/2-phase conversion circuits 201, 202 and 203 and the 2-phase/3-phase conversion circuit 200 in accordance with the counted value $\theta$, therefore, it is possible to synchronize the time axis, i.e., phases, of the control circuit with the phases of the 3-phase A.C. power supply 2A.

The following symbols are used in the description of the control circuit:

$$|V_A^* = \begin{bmatrix} V_{AU}^* \\ V_{AV}^* \\ V_{AW}^* \end{bmatrix} : \text{inverter output voltage command}$$

$$|I_A^* = \begin{bmatrix} I_{AU}^* \\ I_{AV}^* \\ I_{AW}^* \end{bmatrix} : \text{inverter output current command}$$

$$\hat{I}_B = \begin{bmatrix} I_{Bq} \\ I_{Bd} \end{bmatrix} : \text{A.C. power source current}$$

$$\hat{I}_L = \begin{bmatrix} I_{Lq} \\ I_{Ld} \end{bmatrix} : \text{load current}$$

$$\hat{V}_C = \begin{bmatrix} V_{Cq} \\ V_{Cd} \end{bmatrix} : \text{load BUS voltage}$$

$$\hat{V}_C^* = \begin{bmatrix} V_{Cq}^* \\ V_{Cd}^* \end{bmatrix} : \text{load BUS voltage command}$$

$V_C^*$: load BUS voltage amplitude command $$\hat{V}_C^{} = \begin{bmatrix} V_{Cq}^{} \\ V_{Cd}^{**} \end{bmatrix} : \text{load BUS voltage phase command}$$

$V_B$: amplitude of A.C. power supply $P_L$: load power
$P_D$: power necessary for charging
P: power to be supplied from the A.C. power supply
$V_D^*$: battery voltage command
$I_D^*$: charging current command
ω: angular frequency Symbols with the mark * represent command values, while the symbols with the mark ∧ represents the values in terms of coordinate values of the (d-q) 2-axes coordinate system.

The control circuit further has the following components. Referring to FIG. 1, a voltage command generating circuit 312 is capable of outputting the voltage command $V_D^*$ of the storage battery 4. A storage battery voltage controller 311 is connected to the voltage command generating circuit 312 and the voltage detecting circuit 106 through a subtraction device 406. The storage battery voltage controller 311 is capable of outputting the charge current command $I_D^*$ of the storage battery 4 such that the voltage command $V_D^*$ from the voltage command generating circuit 312 coincides with the storage battery voltage $V_D$ detected by the voltage detecting circuit 106. A charge current controller 310 is connected to the storage battery voltage controller 311 and the current detecting circuit 103 through a subtracting device 405. The charge current controller 310 is capable of producing power $P_D$ necessary for the charging, in accordance with the difference between the charge current command $I_D^*$ from the storage battery voltage controller 311 and the value detected by the current detecting circuit 103.

The 3-phase/2-phase conversion circuits 202 and 203 are connected to a multiplier 504 which computes the load power $P_L$. A contact A of a switch 315 is connected through an adder 404 to the multiplier 504 and the charge current controller 310. A filter 309, which is connected to the switch 315, is capable of determining the power P to be supplied from the A.C. power supply 2A by removing unnecessary frequency component from the sum of the power $P_D$ necessary for the charging and the load power $P_L$. A coefficient device 308 for multiplying the power P with a coefficient $\omega L_B/3$ is connected to the filter 309.

A rectifier 307 connected to the 3-phase voltage detecting circuit 105 is capable of rectifying the A.C. voltage $\hat{V}_B$ obtained by the detecting circuit 105 so as to determine the effective voltage $V_B$. A dividing device 500 for computing $\omega L_B/3V_B$ is connected to the rectifier 307 and the coefficient device 308. Numeral 304 denotes an amplitude command generating circuit for generating an amplitude command $\sqrt{3}V_C^*$. A coefficient device 313 having a gain $1/\sqrt{3}$ is connected to the amplitude command generating circuit 304. A dividing device 501 for computing the value of $P\omega L_B/3V_BV_C^*$ is connected to the coefficient device 313 and the dividing device 500.

The 3-phase/2-phase conversion circuit 201 and the amplitude command generating circuit 304 are connected to a dividing device 502 which is capable of computing the quotient $I_{Bq}/\sqrt{3}V_c^*$ by dividing the component $I_{Bq}$ of the A.C. source current $I_B$ and the load BUS voltage amplitude command $\sqrt{3}V_c^*$. A vibration suppressing circuit 306 having a transfer function G(s) is connected to the dividing device 502 and a subtracting device 403 is connected to the vibration suppressing circuit 306 and the dividing device 501. The subtracting device 403 is adapted for subtracting $G(s)\cdot I_{Bq}/\sqrt{3}V_c^*$ from $P\omega L_B/3V_BV_C^*$ so as to compute one component $V_cq^{}$ of the load BUS voltage phase command $\hat{W}_c^{}$. A computing device 305 for computing another component $V_cd^{}=\sqrt{1-V_cq^{2}}$ of the phase command $\hat{W}_C^{**}$ is connected to the subtracting device 403. A multiplier 503 is connected to the computing device 305 and the subtracting device 403. The multiplier 503 computes the load BUS voltage command $\hat{W}_C^*$ as the product of the phase command $\hat{W}_C^{}$ having the components $V_{cq}^{}$ and $V_{cd}^{**}$ and the amplitude command $\sqrt{3}V_C^*$ from the amplitude command generating circuit 304.

A voltage controller 303 is connected to the multiplier 503 and the 3-phase/2-phase conversion circuit 202 through a subtracting device 402. The voltage controller 303 is capable of producing an output signal determined on the basis of the difference between the load BUS voltage $\hat{W}_C$ and the load BUS voltage command $\hat{W}_C^*$ and delivering the same to the 2-phase/3-phase conversion circuit 200. A limiter 302 is connected through an adding/subtracting device 401 to the 2-phase/3-phase conversion circuit 200 and the current detecting circuits 101 and 102. The limiter 302 produces an inverter output current command $|I_A^*$ by limiting the sum of the inverted signal of the A.C. power supply current $I_B$ detected by the current detecting circuit 101, the load current $I_L$ detected by the current detecting circuit 102 and the output of the 2-phase/3-phase conversion circuit 200. A current controller 301 is connected to the limiter 302 and the current detecting circuit 100 through a subtracting device 400. The current controller 301 produces an inverter output voltage command $\hat{W}_A^*$ determined on the basis of the difference between the inverter output current $I_A$ detected by the current detecting circuit 100 and the inverter output current command $|I_A^*$ from the limiter 302. The inverter 1A is connected to the current controller 301 through a PWM circuit 300. The PWM circuit 300 receives the inverter output voltage command $\hat{W}_A^*$ from the current controller 301 and delivers the same to the inverter 1A after a pulse width modulation.

The system including the current controller 301, PWM circuit 300, inverter 1A and 3-phase current detecting circuit 100 form a current control minor loop.

A power-failure detector 314 is connected to the rectifier circuit 307 and a drive circuit 316 for driving the static switch 9 is connected to the power-failure detector 314. The power-failure detector circuit 314 determines whether the A.C. power supply 2A is safe or failed, by examining the effective value $V_B$ of the A.C. source voltage $\hat{W}_B$ which is the output of the rectifier circuit 307. When the A.C. power supply 2A is safe, the power-failure detector circuit 314 turns the switch 315 to a contact A, whereas, when the A.C. power supply 2A is failed, it turns the switch 315 to the contact B. When the switch 315 is connected to the contact B, the input to the filter 309 is changed to "0" so that the output P of the filter 309 also decreases gently to "0" at a rate which is determined by the time constant peculiar thereto. Therefore, the component $V_cq^{}$ of the load BUS voltage phase command $\hat{W}_C^{}$ gently decreases to "0", so that the inverter 1A is smoothly turned into individual operation. The power-failure detector circuit 314 delivers a control signal to the drive circuit 316 thereby turning the switch 9 on and off.

Figure 2:
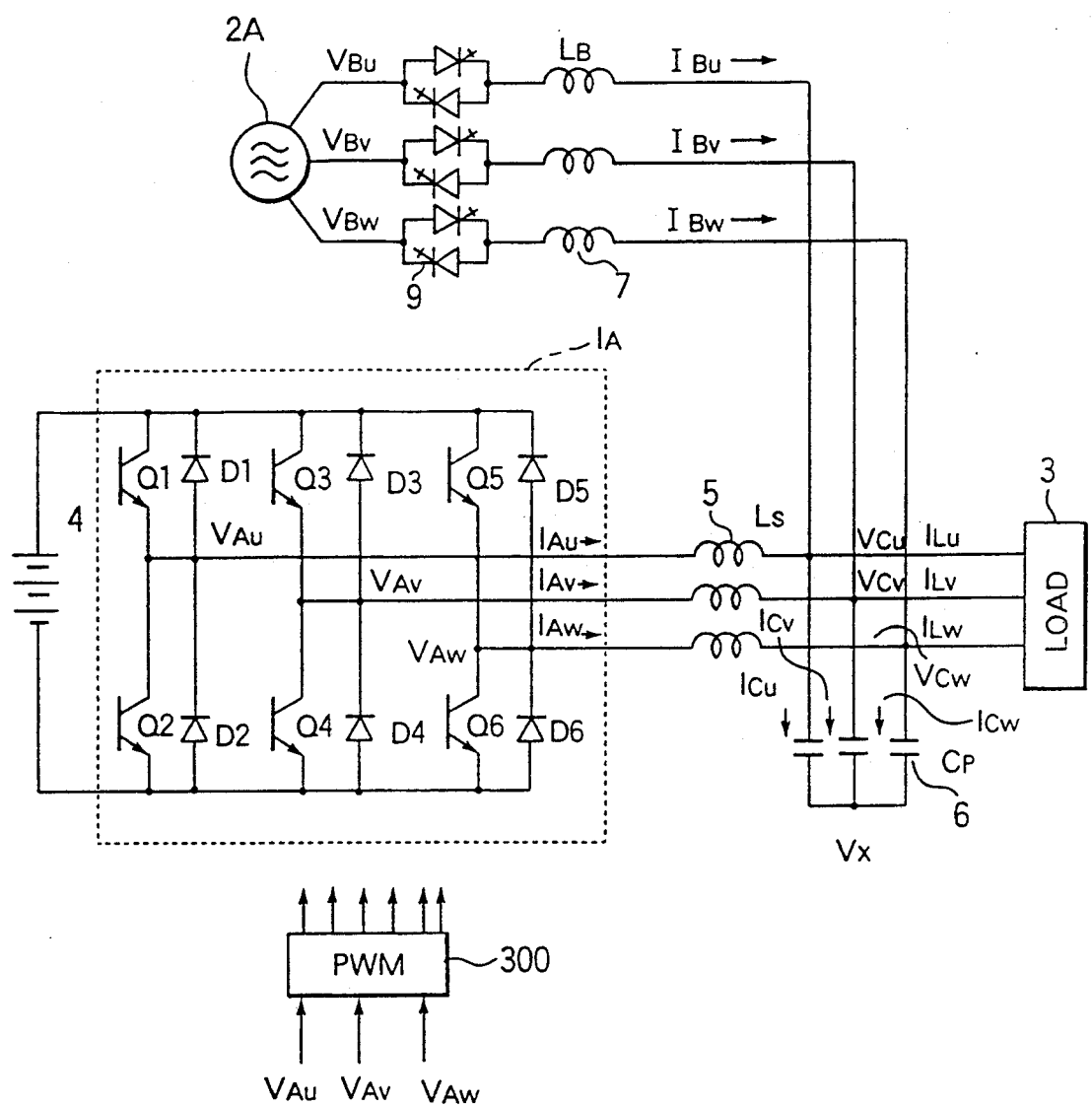
FIG. 2 is a circuit diagram showing a principal portion of the embodiment shown in FIG. 1.

FIG. 2 shows the detail of the main circuit of the 3-phase conversion device. In FIG. 2, the connection is shown in 3 phase. The inverter 1A is a 3-phase bridge inverter including three pairs of series-connected transistors $Q_1-Q_2$, $Q_3-Q_4$ and $Q_5-Q_6$, the pairs being connected in parallel, and three pairs of diodes $D_1-D_2$, $D_3-D_4$ and $D_5-D_6$ which are connected in parallel with corresponding pairs of transistors, whereby 3-phase output voltages $V_{AU}$, $V_{AV}$ and $V_{AW}$ are derived from intermediate points of the pairs of transistors and diodes. The transistors and the diodes are of the type which are capable of performing high-speed switching at frequencies of several kilo hertz or higher, so that the described 3-phase conversion apparatus is capable of conducting control of instantaneous values, which should be contrasted to the conventional apparatus which control only the mean values.

The operation of the described embodiment is as follows.

When the 3-phase power supply 2A is in safe condition, the static switch 9 is turned on by the control circuit shown in FIG. 1, so that power is supplied from the A.C. power supply 2A to the load 3 through the inductance 7. The inverter 1A controls the reactive power in accordance with the variation of the source voltage $V_B$ and the variation in the level of the load 3, so as to control the voltage drop across the inductance 7 thereby maintaining a constant voltage $V_C$ of the load BUS line. The inverter 1A generates a current of a phase inverse to the higher harmonic currents of the load 3 thereby suppressing strain of voltage attributable to the higher harmonics of the load 3. In addition, the charging power supplied from the inverter 1A to the storage battery 4 is controlled thereby to control the charging current and charging voltage for the storage battery 4 at predetermined levels.

Any abnormality in the A.C. power supply 2A, e.g., power failure, is detected by the control circuit which operates to turn off the static switch 9, so that the inverter 1A operates independently by using the power supplied from the storage battery 4. Recovery of the A.C. power supply 2A is detected by the control circuit which then operates to synchronize the inverter 1A with the A.C. power supply 2A and turns the static switch 9 on, whereby the 3-phase A.C. power supply 2A is turned into normal operation.

The detail of the operation is as follows.

Figure 3:
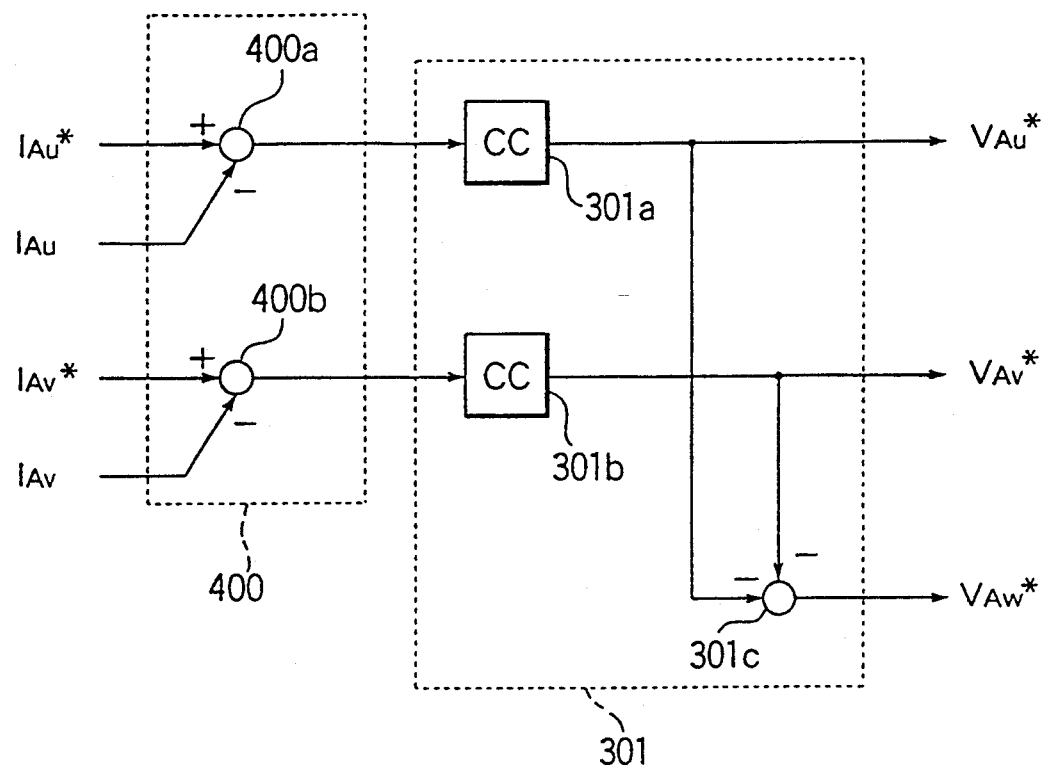
FIG. 3 is a schematic circuit diagram illustrative of the principle of a current controller used in the first embodiment.

A description will be given first of the operation of the current control minor loop, with specific reference to FIG. 3. Referring to this Figure, the current controller 301 has an adder 301c and amplifier circuits 301a and 301b, while the subtracting device 400 has two subtracting units 400a and 400b. The control of the instantaneous value of the output current $I_A$ of the inverter 1A is conducted on a 3-axis coordinate system. As shown in FIG. 2, the 3-phase components $I_{AU}$, $I_{AV}$ and $I_{AW}$ of the inverter output current $I_A$ satisfy the condition of $I_{AU} + I_{AV} = -I_{AW}$. Therefore, all the components are controlled when any two phases component out of three phase components, e.g., $I_{AU}$ and $I_{AV}$, are controlled. The component $I_{AW}$ is therefore omitted from FIG. 3. The differential between the inverter output current command $I_{AU}^*$ of the U phase and the U-phase component $I_{AU}$ of the inverter output current $I_A$ is determined by the subtracting unit 400a and the thus determined differential is amplified by the amplifier circuit 301a of, for example, proportional-integration type. The amplified differential is delivered to the PWM circuit 300 as the voltage command, so that the component $I_{AU}$ is controlled in a manner to follow the command $I_{AU}^*$. A similar operation is conducted in regard to the V phase by the subtracting unit 400b and the amplifier circuit 301b so that the component $I_{AV}$ is controlled so as to follow the command $I_{AV}^*$. The command to the PWM circuit 300 of the W phase is determined in accordance with the formula $V_{AW}^* = -V_{AU}^* - V_{AV}^*$, by supplying the PWM commands $V_{AU}^*$ and $V_{AV}^*$ of the U and V phases to the adder 301c.

Figure 4:
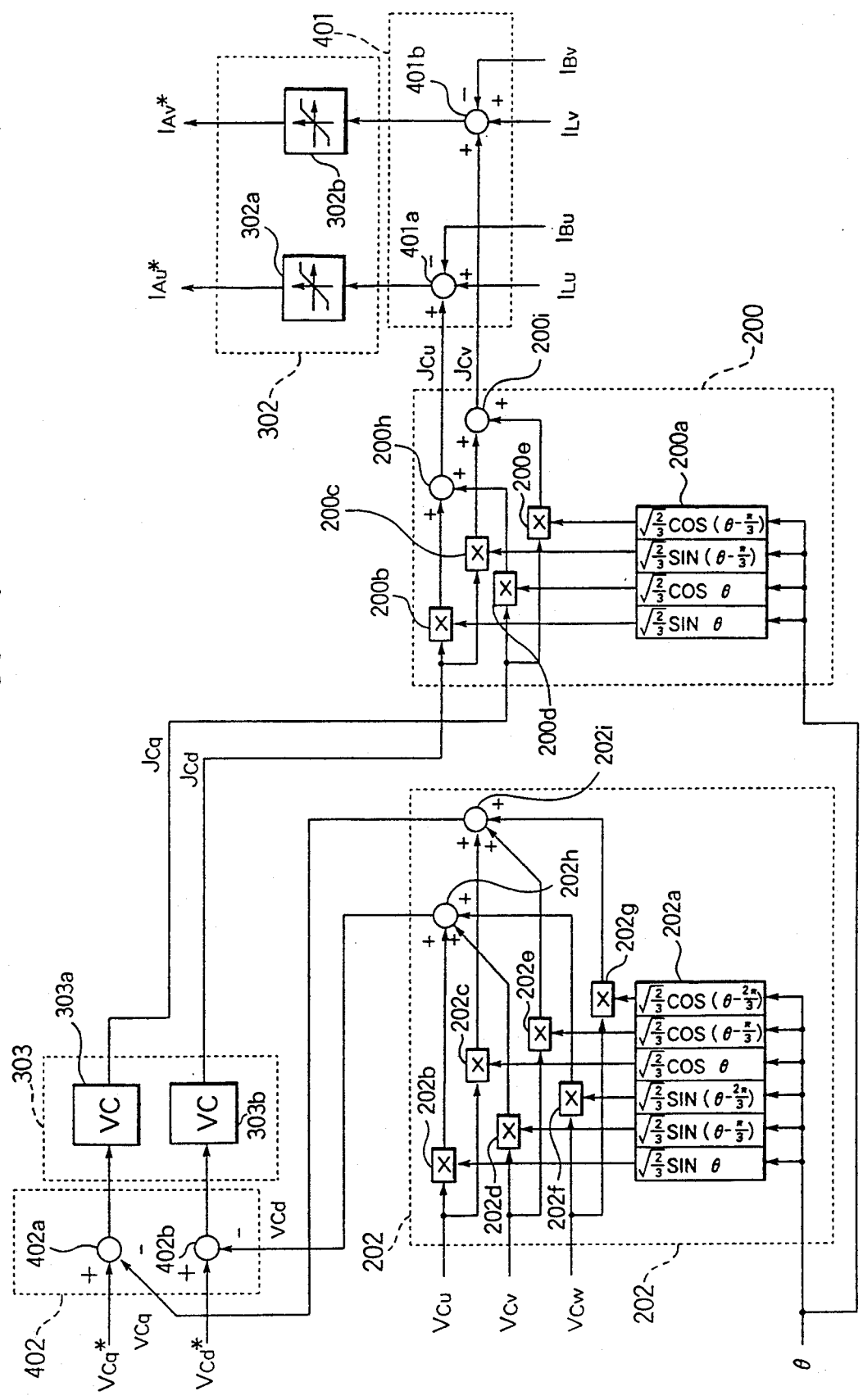
FIG. 4 is a schematic circuit diagram illustrative of the principle of a voltage controller used in the first embodiment.

A description will be given of the voltage control system which forms a major loop in contrast to the above-described current control minor loop, with specific reference to FIG. 4. The voltage control system is composed mainly of the voltage controller 303. The 3-phase/2-phase conversion circuit 202 is connected to the same side of the voltage controller 303 as the load BUS 8, while the 2-phase/3-phase conversion circuit 200 and the limiter 302 are connected to the same side of the voltage controller 303 as the inverter 1A. In this voltage controller 303, the control of the instantaneous value of the load BUS voltage $V_C$ is conducted on a (d-q) 2-axes coordinate. Namely, the load BUS voltage $V_c$ on the 3-axes coordinate system is converted by the 3-phase/2-phase conversion circuit 202 into a signal $\hat{V}_C$ on the (d-q) 2-axes coordinate system. Conversely, the output from the voltage controller 303 is converted again into 2-phase/3-phase conversion circuit 200 into a value on the 3-axes coordinate system.

The 3-phase/2-phase conversion circuit 202 includes a sine-wave generating circuit 202a, multipliers 202b to 202g and adders 202h and 202i. The sine-wave generating circuit 202a is capable of generating sine waves $\sqrt{\frac{2}{3}} \sin(\theta - nn/3)$ and $\sqrt{\frac{2}{3}} \cos(\theta - nn/3)$, where, n being 0, 2 and 4, using the counted value $\theta$ derived from the counter 207. The 3-phase/2-phase conversion circuit 202 conducts the following computation.

$$\hat{V}_C = \begin{bmatrix} V_{Cq} \\ V_{Cd} \end{bmatrix} = \mathbb{C} \begin{bmatrix} V_U \\ V_V \\ V_W \end{bmatrix} = \mathbb{C} V_C$$

where, $$\mathbb{C} = \sqrt{\frac{2}{3}} \begin{bmatrix} \cos\theta & \cos\left(\theta - \frac{2\pi}{3}\right) & \cos\left(\theta - \frac{4\pi}{3}\right) \\ \sin\theta & \sin\left(\theta - \frac{2\pi}{3}\right) & \sin\left(\theta - \frac{4\pi}{3}\right) \end{bmatrix}$$

The subtracting device 401 has two operation units 401a and 401b, while the subtracting unit 402 has two operation units 402a and 402b.

Subsequently, the differential between the component $V_{Cq}$ of the load BUS voltage derived from the 3-phase/2-phase conversion circuit 202 and the command $V_{Cq}^*$ is determined by the computing unit 402a, and the thus determined differential is amplified by an amplifier circuit 303a such as of proportional-integrating type. Similarly, the differential between the component $V_{Cd}$ of the load BUS voltage and the command value $V_{Cd}^*$ is determined by the computing unit 402b and is amplified by the amplifier circuit 303b. The signals $J_{Cq}$ and $J_{Cd}$ amplified by the amplifier circuits 303a and 303b are converted into signals $J_{CU}$ and $J_{CV}$ on the 3-axes coordinate system by means of the 2-phase/3-phase conversion circuit 200.

The 2-phase/3-phase conversion circuit 200 includes a sine-wave generating circuit 200a, multipliers 200b to 200e and adders 200h and 200i. The sine-wave generating circuit 202a is capable of generating sine waves $\sqrt{\frac{2}{3}} \sin(\theta - mn/3)$ and $\sqrt{\frac{2}{3}} \cos(\theta - mn/3)$, where, m being 0 and 2, using the counted value $\theta$ derived from the counter 207. The 2-phase/3-phase conversion circuit 200 conducts the following computation.

$$\begin{bmatrix} J_{CU} \\ J_{CV} \end{bmatrix} = \sqrt{\frac{2}{3}} \begin{bmatrix} \cos\theta & \sin\theta \\ \cos(\theta - 2\pi/3) & \sin(\theta - 2\pi/3) \end{bmatrix} \begin{bmatrix} J_{Cq} \\ J_{Cd} \end{bmatrix}$$

The value $J_{CU}$ determined by this computation is input to the computing device 401a which forms a signal $(J_{CU}+I_{LU}-I_{BU})$. This signal is then limited by a current command limiter circuit 302a, whereby a current command $I_{AU}^*$ of the U phase is formed. The same processing is executed in the V phase. In this voltage control system, the amplifier circuits 303a and 303b are composed of amplifiers of, for example, proportional-integration type, and the inverter output current command $|I_A^*$ is controlled such that the load BUS voltage command $V_{Cq}^*$ and $V_{cd}^*$ respectively coincide with the fed back BUS voltages $V_{cq}$ and $V_{cd}$. Upon receipt of this output current command $|I_A^*$, the current control system as a current minor loop enables the current $|I_A$ instantaneously follow the command $|I_A^*$, whereby a control is effected to make the load BUS voltage $\hat{V}_C$ coincide with the voltage command $\hat{V}_C^*$.

A description will be given as to the method in which the voltage command $\hat{V}_C^*$ is formed when the switch 315 is connected to the contact A. The voltage command $\hat{V}_C^*$ is determined from the power P supplied from the A.C. power supply 2A. It is assumed here that the U-phase voltage $V_{BU}$ of the A.C. power supply 2A is represented by $\sqrt{2}V_B \sin \omega t$, while the U-phase voltage $V_{CU}$ of the load BUS 8 is given by $\sqrt{2}V_C\sin(\omega t - \Phi) = \sqrt{2} V_C(\sin \omega t \cos \Phi - \cos \omega t \sin \Phi)$.

In this case, the U-phase current $I_{BU}$ supplied to the load BUS 8 and the U-phase power $P_U$ are given as follows:

$$I_{BU} = \frac{1}{L_B} \int (V_{BU} - V_{CU}) dt =$$

$$\frac{\sqrt{2}}{\omega L_B} \{(V_C \cos\phi - V_B)\cos\omega t + V_C \sin\phi \cdot \sin\omega t\} =$$

$$\frac{\sqrt{2} V_L}{\omega L_B} \sin(\omega t + \alpha)$$

where, $$V_L = \sqrt{V_B^2 + V_C^2 - 2V_B V_C \cos\phi}$$

$$\cos\alpha = \frac{V_C}{V_L} \sin\phi$$

$$P_U = \frac{1}{T} \int_0^T V_{CU} \cdot I_{BU} dt$$

$$= \frac{V_B V_L}{\omega L_B} \cos\alpha$$

$$= \frac{V_B V_C}{\omega L_B} \sin\phi$$

Therefore, the power P which is supplied from the 3-phase A.C. power supply 2A into the load BUS 8 through the inductance 7 is determined as follows.

$$P = 3P_U = 3 \cdot \frac{V_B V_C}{\omega L_B} \sin\phi$$

It is therefore possible to determine the angle $\Phi$ of delay of the load BUS voltage $V_C$ with respect to the A.C. source voltage $V_B$ in accordance with the following formula, provided that the required power P and the command $V_C^*$ of amplitude of the load BUS voltage are given.

$$\sin\phi = P \cdot \frac{\omega L_B}{3} \cdot \frac{1}{V_B} \cdot \frac{1}{V_C^*}$$

In this embodiment, the voltage command $\hat{V}_C^*$ is given on the (d−q) 2-axes coordinate system synchronous with the A.C. source voltage $\hat{V}_B$, as follows.

$$\hat{V}_C^* = \begin{bmatrix} V_{Cq}^* \\ V_{Cd}^* \end{bmatrix} = \begin{bmatrix} \sqrt{3} V_C^* \sin\phi \\ \sqrt{3} V_C^* \cos\phi \end{bmatrix} =$$

$$\begin{bmatrix} \sqrt{3} V_C^* \sin\phi \\ \sqrt{3} V_C^* \sqrt{1 - \sin^2\phi} \end{bmatrix} =$$

$$\begin{bmatrix} \sqrt{3} V_C^* \left( P \cdot \frac{\omega V_B}{3} \cdot \frac{1}{V_B} \cdot \frac{1}{V_C^*} \right) \\ \sqrt{3} V_C^* \sqrt{1 - \left( P \cdot \frac{\omega L_B}{3} \cdot \frac{1}{V_B} \cdot \frac{1}{V_C^*} \right)^2} \end{bmatrix}$$

This operation is executed by the coefficient devices 308, 313, dividing device 500, 501 and the multiplier 503. The required power P is given as the sum of the load power $P_L$ and the charging power $P_D$ of the storage battery 4. The load power $P_L$ is obtained by conducting the following computation by the multiplier 504.

$$P_L = |\hat{V}_C \times I_L| = |\hat{V}_C \times I_L|$$
$$= V_{cq} \cdot I_{Lq} + V_{cd} \cdot I_{Ld}$$

The charging power $P_D$ for charging the storage battery 4 is determined by the charging current controller 310. The manner in which the charging power $P_D$ was explained before so that description is omitted in this connection to avoid duplication of explanation. In this embodiment, in order to minimize wasteful discharge from the storage battery 4, a feed-forward control is conducted on the above-mentioned phase delay $\Phi$ in accordance with the load power $P_L$ and the A.C. power source voltage $\hat{V}_B$, rather than to start the control after detection of a change in the voltage of the storage battery 4. However, when this feed-forward control is conducted too quickly, the phase of the load BUS voltage $\hat{V}_C$ is changed also quickly. In this embodiment, therefore, a filter 309 having a time constant of 0.1 second or so is used to suppress the rate of change in the phase.

A description will now be given of the vibration suppressing circuit 306 for suppressing vibration of the A.C. source current $I_B$ which is particularly significant in the control circuit.

Figure 5:
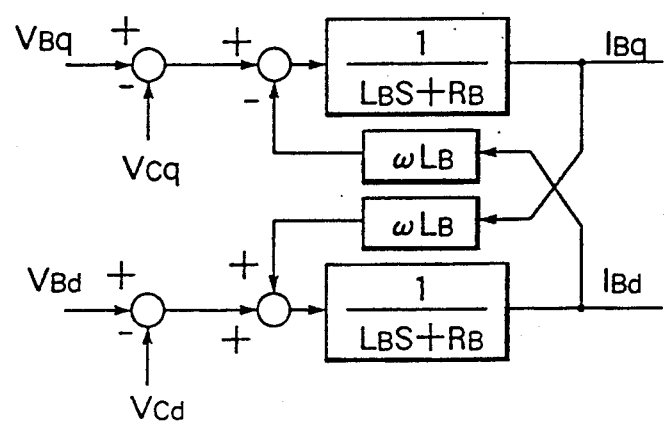
FIGS. 5, 6 and 7 are circuit diagrams illustrating the principle of operation for suppressing the vibration of the A.C. power supply current of the embodiment shown in FIG. 1.

FIG. 5 is a circuit diagram showing the relationship between the A.C. source current $\hat{I}_B$, A.C. source voltage $\hat{V}_B$ and the load BUS voltage $\hat{V}_C$. Referring to this Figure, $R_B$ represents the value of the resistance possessed by the inductance 7. In general, the resistance $R_B$ is very small and can be considered to meet the condition of $R_B \leq (\omega L_B)10$. Representing the voltage applied to the inductance 7 by $\hat{V}_{BC} = \hat{V}_B - \hat{V}_C$, the function of transfer from $V_{BC}$ to $\hat{I}_B$ is determined as follows.

$$\frac{I_{Bq}}{V_{BCq}} = \frac{\frac{1}{L_B}\left(S + \frac{R_B}{L_B}\right)}{S^2 + 2\frac{R_B}{L_S}S + \left(\frac{R_B^2}{L_B^2} + \omega^2\right)}$$

$$\frac{I_{Bd}}{V_{BCd}} = \frac{\frac{\omega}{L_B}}{S^2 + 2\frac{R_B}{L_S}S + \left(\frac{R_B^2}{L_B^2} + \omega^2\right)}$$

Assuming that the frequency of the 3-phase A.C. power supply is 60 Hz, the resonance frequency $\omega_n$ and the attenuation coefficient $\xi$ are respectively given as follows:

$$\omega_n = \left(\frac{R_S^2}{L_B^2} + \omega^2\right)^{\frac{1}{2}} \cong (0.01\omega^2 + \omega^2)^{\frac{1}{2}} \cong \omega$$

$$= 2\pi \cdot 60 = 377$$

$$\zeta = \frac{R_B}{L_B \omega_n} \cong \frac{R_B}{L_B \omega} \cong 0.1$$

Figure 6:
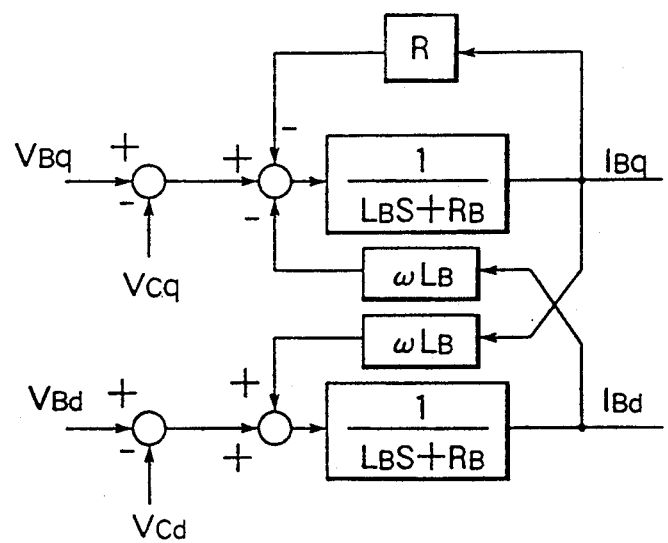

This block forms a vibration circuit since the resistance $R_B$ is small as described above. Therefore, the vibration of the current $I_{Bq}$ is suppressed by providing an imaginary resistor R in accordance with the control explained in connection with FIG. 6. For instance, in order to obtain the attenuation coefficient $\xi = 0.7$ when $L_B$ is 20%, the resistance R and the resonance frequency $\omega_n$ should be $R = 19.4\%$ and $\omega_n = 1.4\omega$.

The formation of the load BUS voltage command $V_C^*$ is based on the arrangement shown in FIG. 5. Therefore, the voltage drop caused by the resistor R acts as a disturbance to the control of the share of the power with the 3-phase A.C. power supply 2A. In this embodiment, therefore, a transfer function G(s) which exhibits resistance characteristic only in the frequency region around 60 Hz is given to the vibration suppressing circuit 306, so that the vibration of the current $I_{Bq}$ can be suppressed without impairing the share of the electric power.

Figure 7:
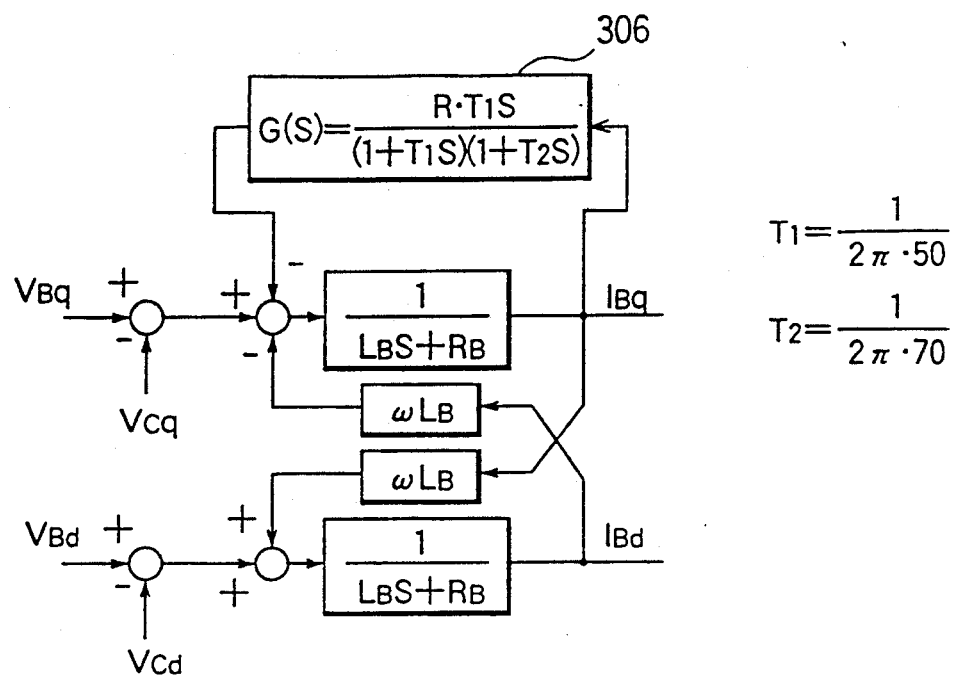
Figure 8:
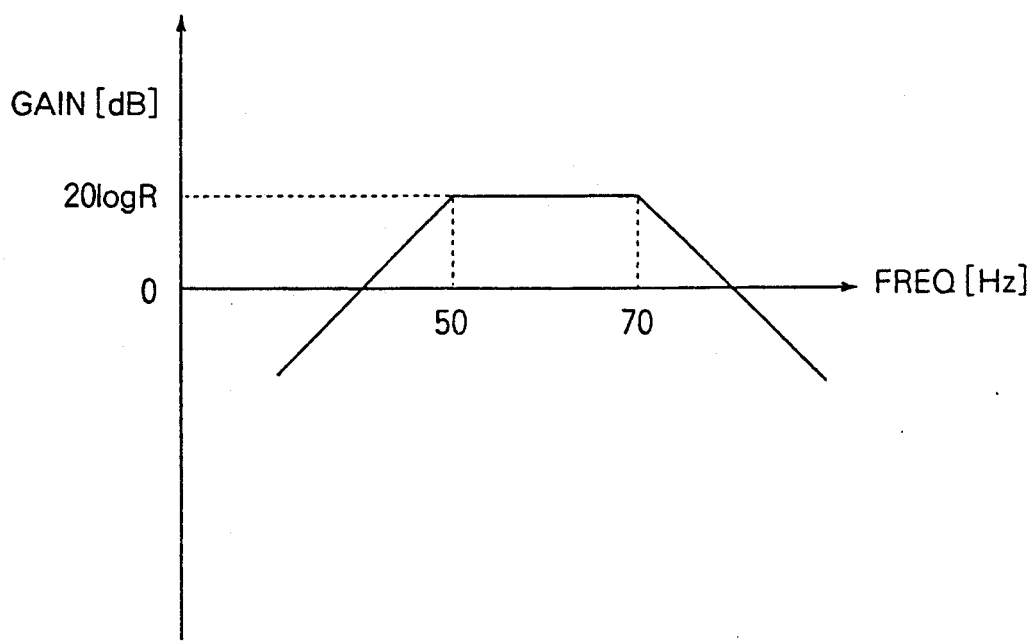
FIG. 8 is a characteristic chart showing the gain of a transfer function used in the control for suppressing vibration.

FIG. 7 is a circuit diagram showing the construction of the vibration suppressing circuit 306, while FIG. 8 is a characteristic chart showing the gain characteristic of the transfer function G(s). In the system shown in FIG. 1, $I_{Bq}$ is divided by $\sqrt{3} V_C^*$ by means of the dividing device 502 and the quotient is input to the vibration suppressing circuit 306. This division is necessary because the signal is to be multiplied with $\sqrt{3}V_C^*$ by the multiplier 503. In this embodiment, the imaginary resistance R is provided only on the q-axis, for the following reasons (a) and (b).

(a) As shown in the main circuit model in FIG. 5, the value of the current $I_{Bd}$ is determined by integrating the sum of the components $\omega L_B I_{Bq}$, $V_{Bd}$ and $V_{Cd}$. Therefore, when the vibration of the current $I_{Bq}$ is suppressed, the vibration of the current $I_{Bd}$ also is suppressed partly because the voltage $V_{Bd}$ is stable in the A.C. power supply and partly because $V_{Cd}$ is controlled to have no vibration component.

(b) If imaginary resistances for suppressing vibration are provided both for the currents $I_{Bd}$ and $I_{Bq}$, the condition $V_{Cq}^{2} + V_{Cd}^{2} = 1$ is no more satisfied, so that the load BUS voltage command $\hat{V}_C^*$ cannot be maintained constant.

A description will now be given of the case where an abnormality, e.g., a power failure, has taken place in the 3-phase A.C. power supply 2A. In such a case, the abnormality is instantaneously detected by the power-failure detector 314 so that the drive circuit 316 operates to turn the static switch 9 off while turning the switch 315 to the contact B. Consequently, the input to the filter 309 is reduced to "0" and $V_{Cq}^{**}$ is gently reduced to "0" at a rate which is determined by the time constant of the filter 309. The phase synchronizing means 204 to 207 are of the type which can run by themselves even when the 3-phase power supply 2A is shut off. In the event of a failure of the 3-phase A.C. power source 2A, therefore, a stable power is supplied to the load 3 from the battery 4, without causing any drastic change in the load BUS voltage. Recovery of 3-phase A.C. power supply 2A is detected by the power-failure detector 314 and, after the phase synchronizing means 204 to 207 are synchronized with the phases of the 3-phase A.C. power supply 2A, the static switch 9 is turned on so that the switch 315 is turned to select the contact A. Thus, when the 3-phase A.C. power supply 2A is recovered, the supply of the effective power from the 3-phase A.C. power supply 2A to the load 3 is commenced gently at a rate determined by the time constant of the filter 309, without causing drastic change in the load BUS voltage.

Figure 9A:
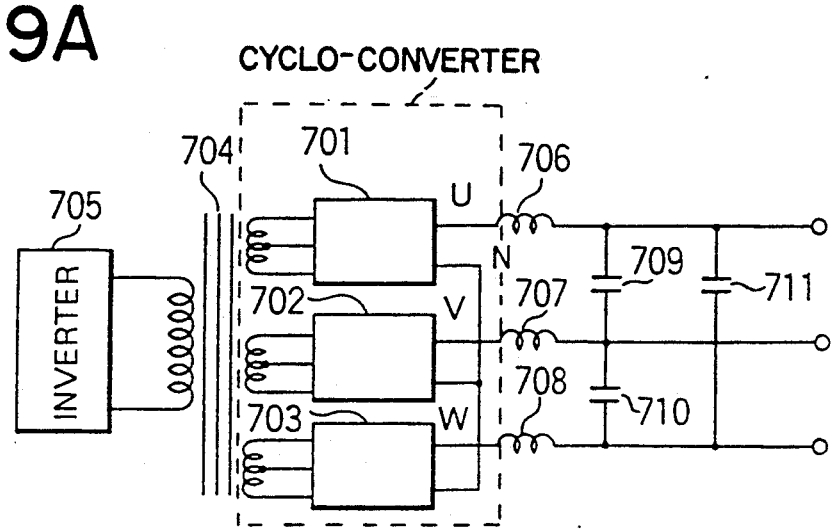
FIGS. 9A and 9B are circuit diagrams of modifications of the 3-phase converter means.
Figure 9B:
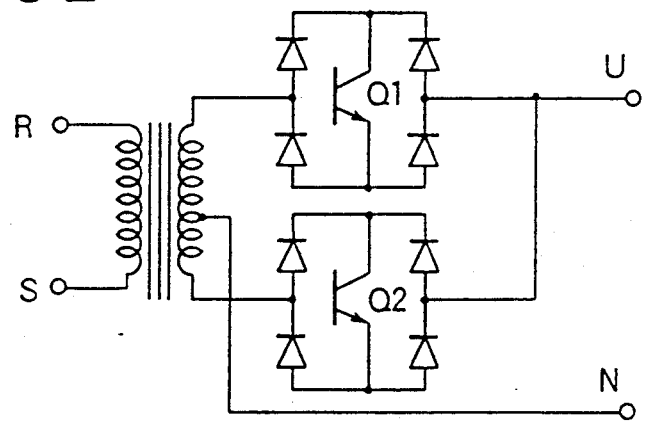
Figure 10:
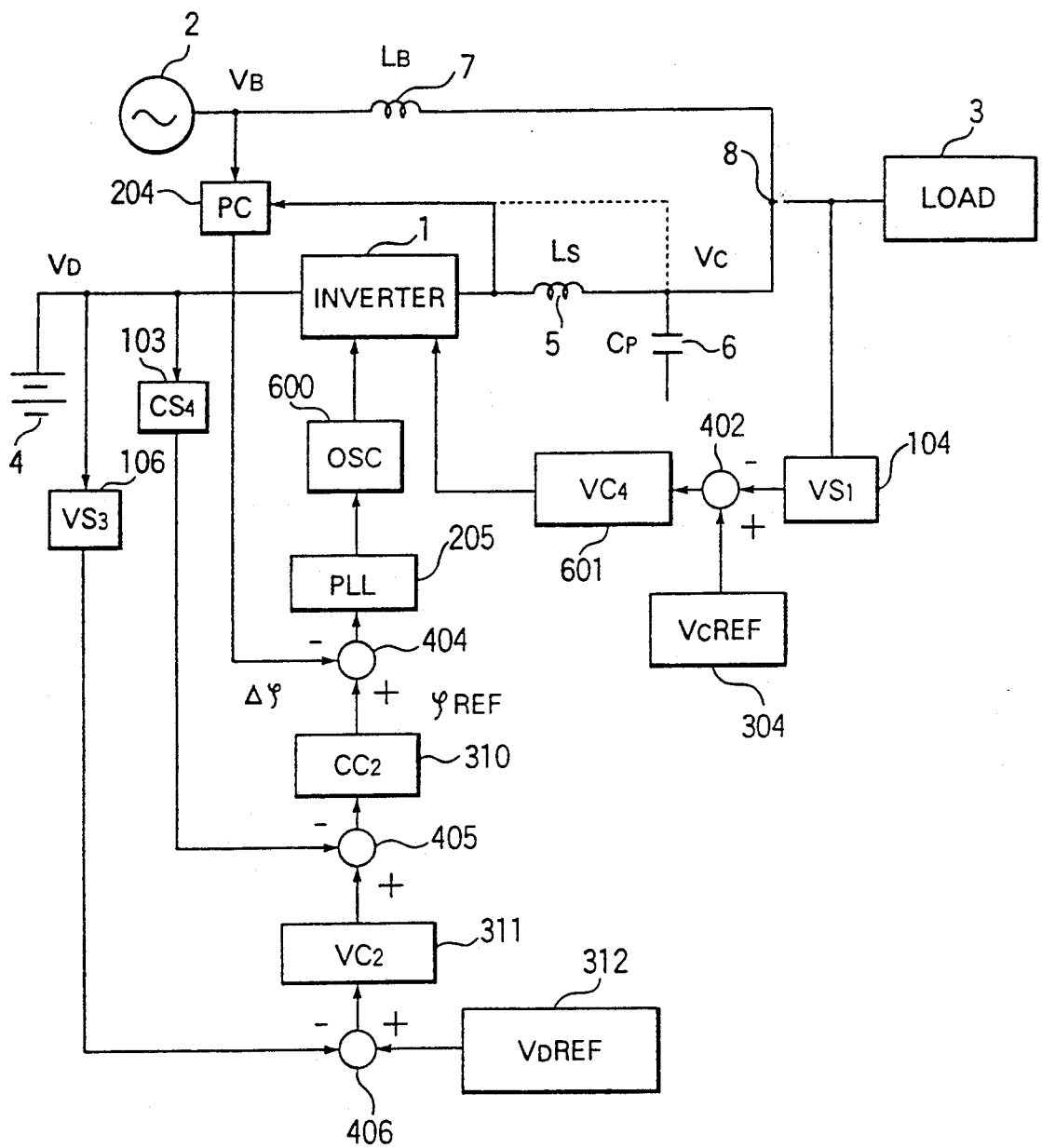
FIG. 10 is a block diagram of a known converter apparatus.

Although the inverter 1A is used in the described embodiment, this is not exclusive and the same advantages can be brought about when a high-frequency intermediate ring-type 3-phase converter as shown in FIG. 9A is used in place of the inverter 1A. In such an arrangement, a high-frequency single-phase power supply generated by the inverter 705 is converted into a low-frequency power, by means of three cyclo-convertors 701, 702, 703 of self arc-extinction type, whereby sine waves of low frequency are obtained through filters formed by inductances 706, 707, 708 and the capacitors 709, 710, 711. In this case, a control circuit which is the same as that used for the inverter 1A shown in FIG. 1 is used. A distributing circuit is provided on the output of each phase of the PWM circuit, e.g., the U phase, and is synchronized in accordance with the polarity of the output of the inverter so as to distribute the output of the PWM circuit to the elements Q1 and Q2 shown in FIG. 9B, whereby an U-phase output is obtained with the same waveform as that obtained when the inverter 1A of FIG. 1 is used.

Thus, the present invention can be applied not only to the voltage-type inverter but also to various types of 3-phase conversion devices capable of following up a current command.

In the described embodiment, the current control effected by the minor loop and the voltage control effected by the major loop are conducted by using analog signals. This, however, is only illustrative and the same advantages are brought about when other suitable control methods such as digital control method or hysteresis comparator type method are used in place of the described analog circuit.

In the described embodiment, the control of the output current of the 3-phase converter device is conducted on a 3-axes coordinate system, while the load BUS voltage is controlled on a (d-q) 2-axes coordinate system. Each of these controls, however, may be conducted on either one of these two coordinate systems.

When the voltage control is conducted on a 3-axes coordinate system, a signal is formed by multiplying the current of at least one of the three phases, e.g., U phase, with a transfer function which exhibits resistance characteristic at the power supply frequency, and this signal is subtracted from the U phase voltage command thereby forming a source current for suppressing vibration.

In the embodiment described above, the 3-phase A.C. power supply 2A is connected to the load BUS 8 through the inductance 7. It is to be understood that the same advantage can be obtained when a capacitor is used in place of the inductance 7. When the inductance is used, the desired power is derived from the A.C. power supply by making use of the fact that the phase of the load BUS voltage is delayed behind the phase of the A.C. power supply. In contrast, when a capacitor is used in place of the inductance 7, the desired power is obtained from the A.C. power supply by making use of the fact that the phase of the load BUS voltage suitably advances ahead of the A.C. power supply.

Instead of using a reactance circuit such as inductance 7 or a capacitor, it is possible to make use of the line impedance between the A.C. power supply 2A and the load line 8.

Figure 11:
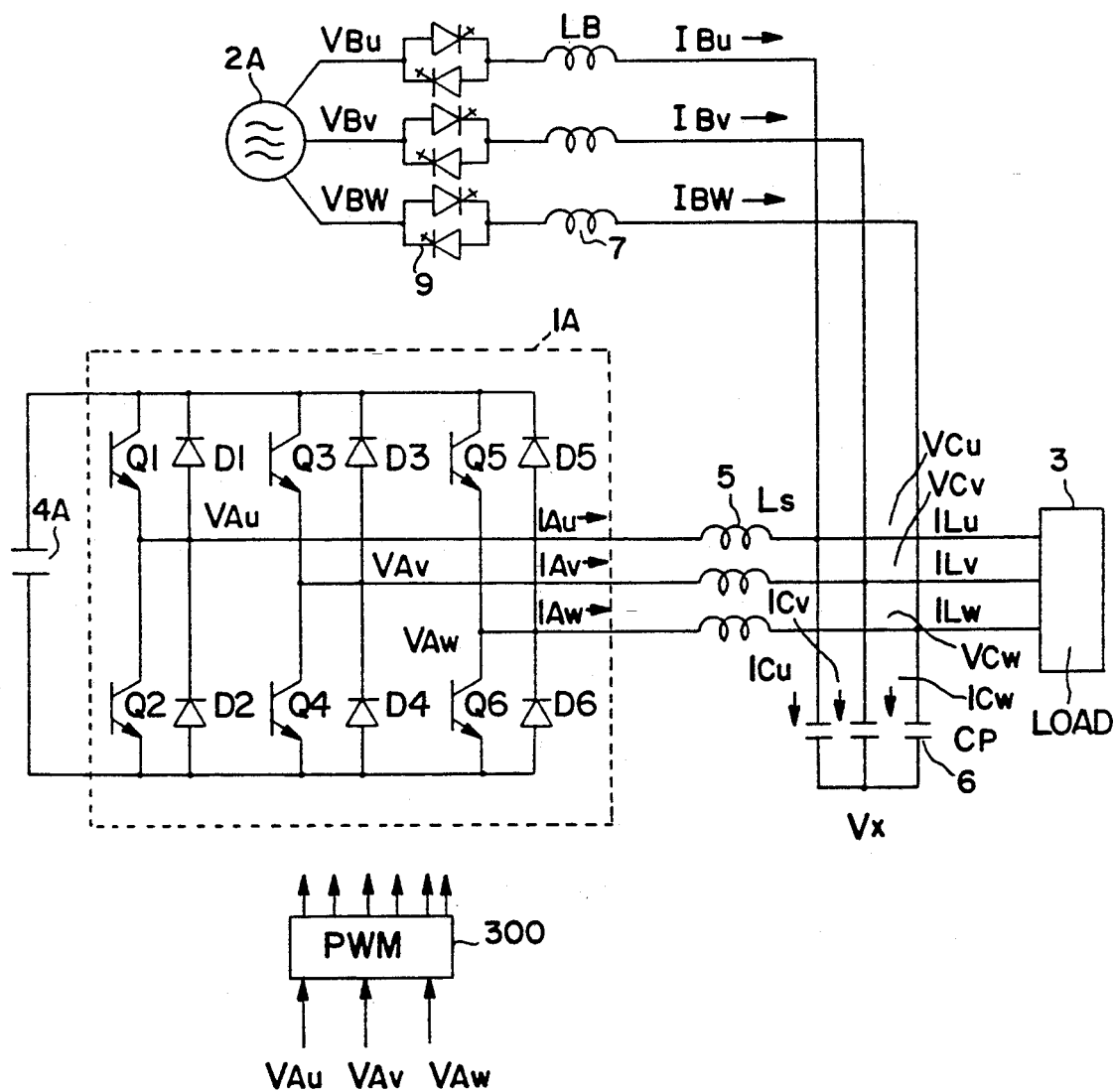
FIG. 11 is a circuit diagram showing a capacitor connected across the converter of FIG. 1.
Figure 12:
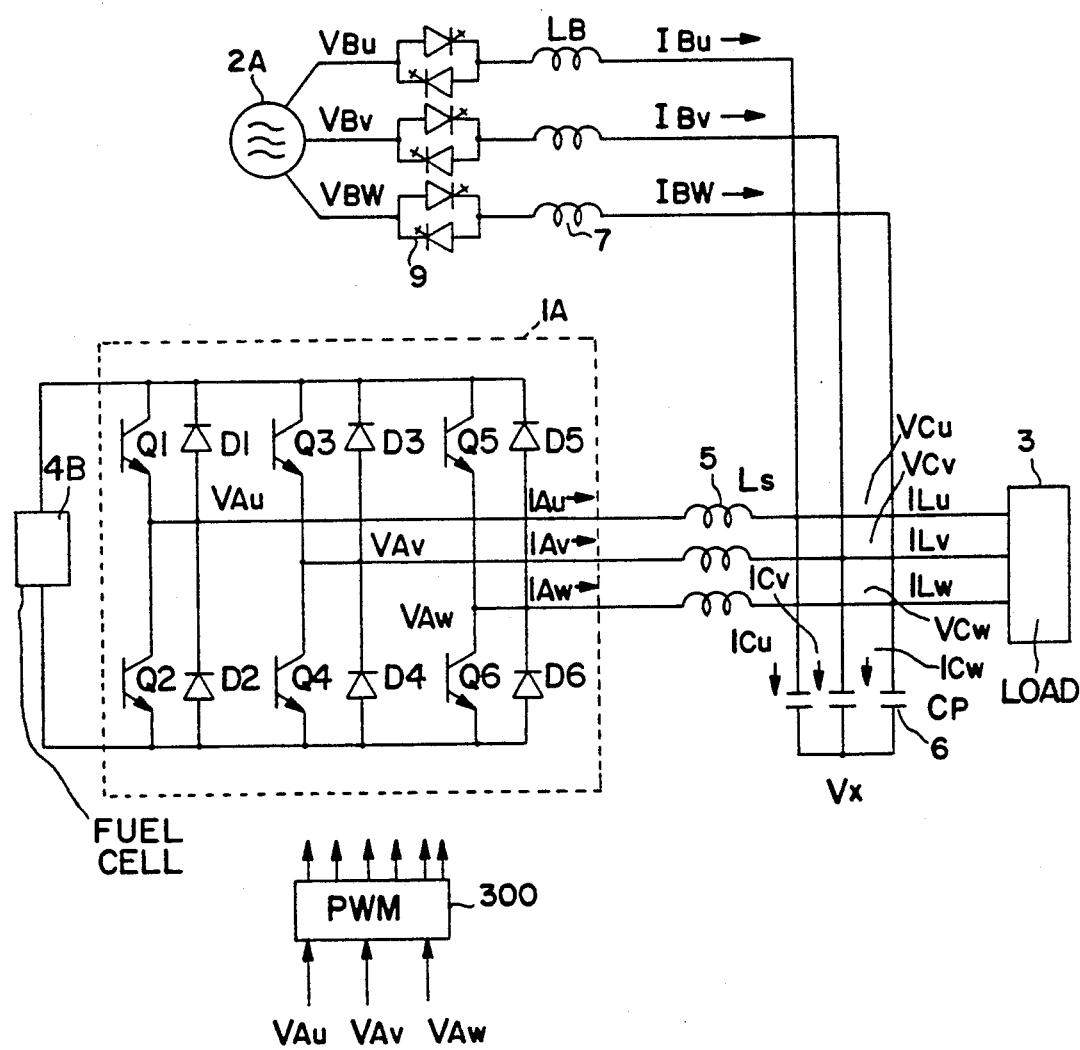
FIG. 12 is a circuit diagram showing a fuel battery connected across the converter of FIG. 1.
Figure 13:
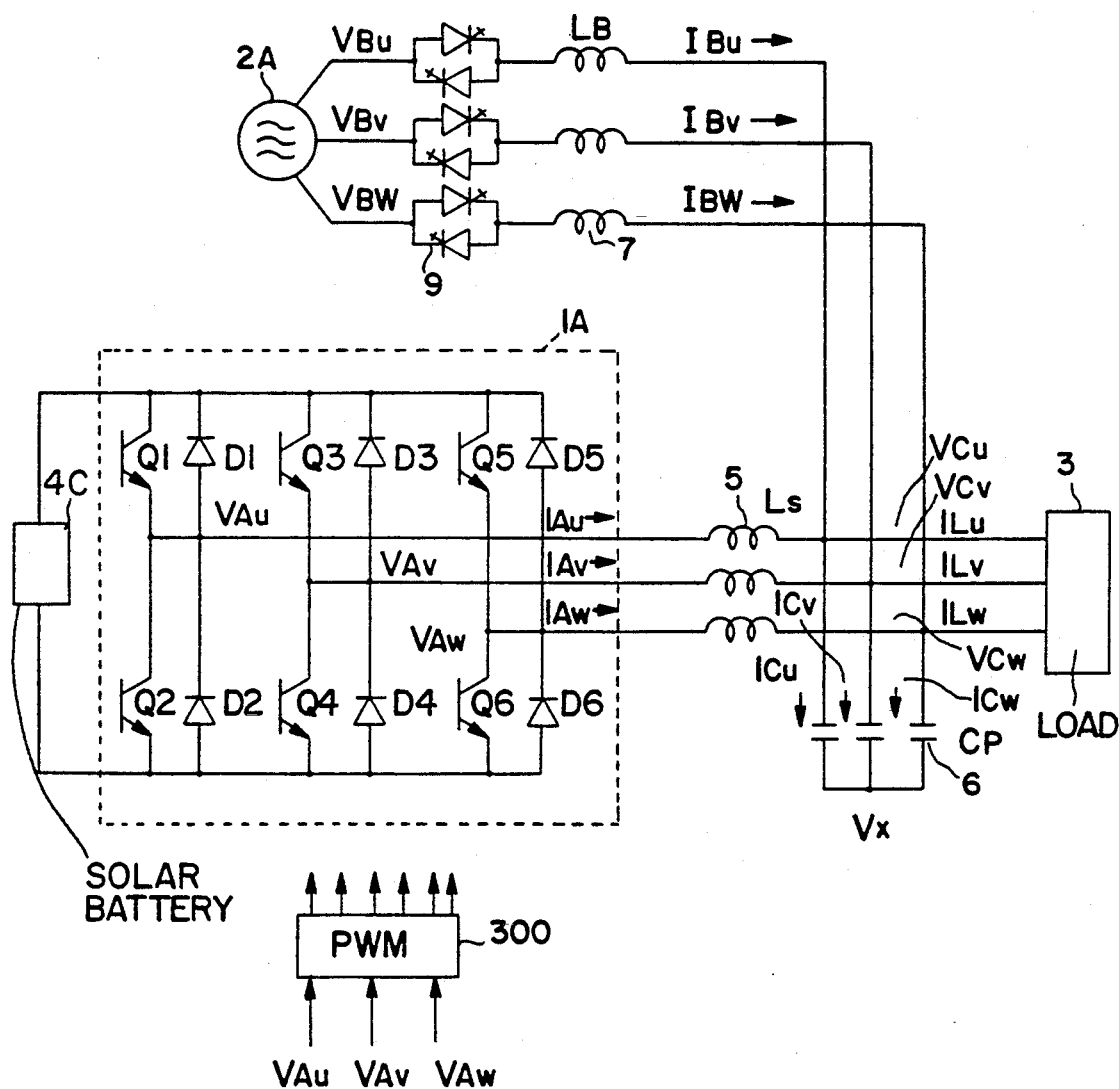
FIG. 13 is a circuit diagram depicting a solar battery connected across the converter of FIG. 1.
Figure 14:
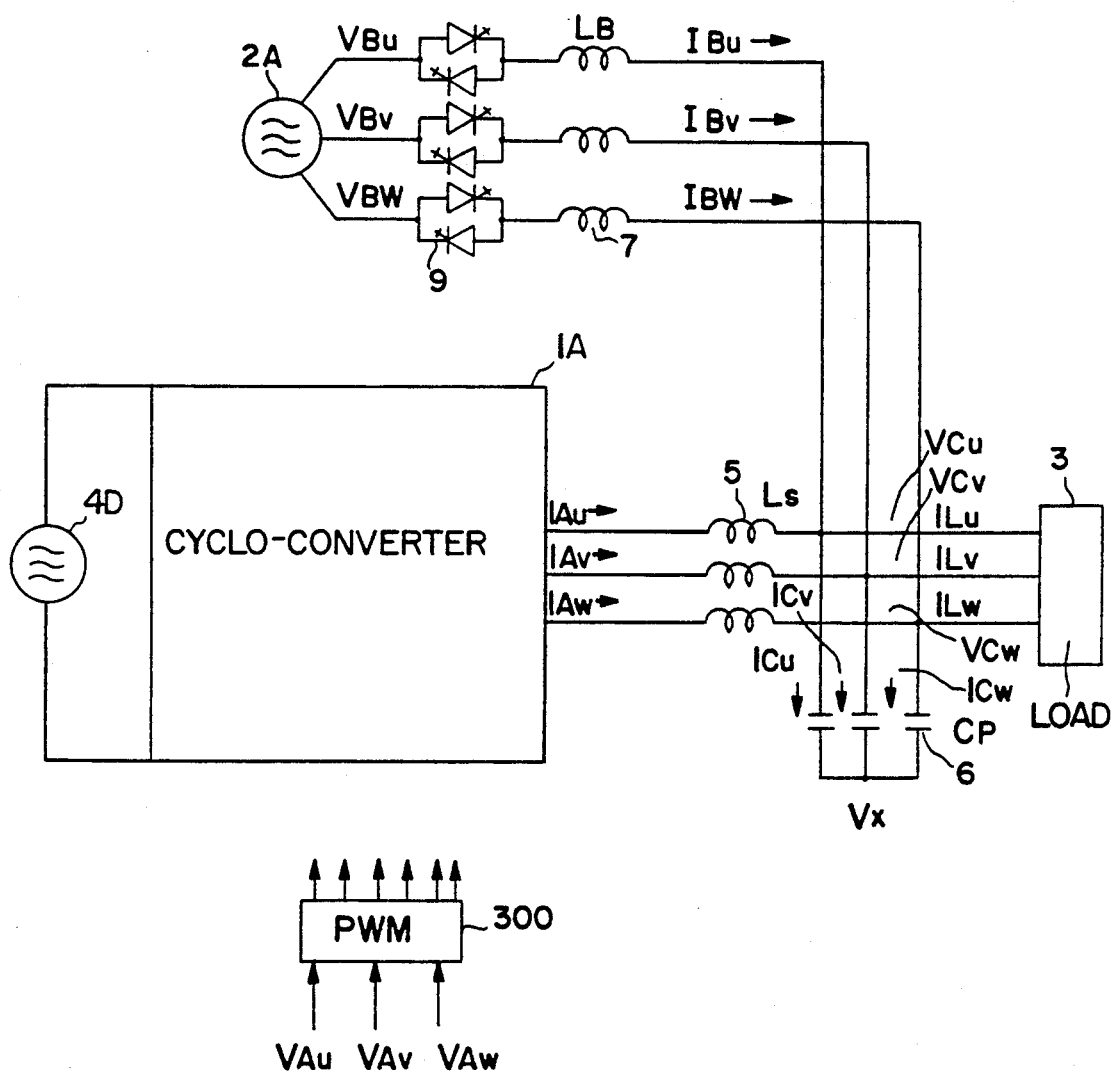
FIG. 14 is a circuit diagram illustrating an AC power supply connected across the CYCLO-converter of FIG. 9A.

Although the described UPS (Uninterruptible Power Supply) incorporates a storage battery 4, it is possible to use a solar battery 4C in place of the storage battery 4 as depicted in FIG. 13. Thus, the invention can be applied to a photo-power-generating system. In such a case, the command $P_D$ of the D.C. power shown in FIG. 1 is varied in accordance with the change in the electric power generated by the solar battery. The invention can equally be applied to a power generating system using a fuel battery 4B as depicted in FIG. 12. Furthermore, the principle and construction of the described embodiment can directly be applied, as seen in FIG. 11, to an active filter in which the storage battery is eliminated while only capacitors 4a are incorporated in the D.C. circuit so that the reactive power and the higher harmonics are controlled by the inverter thereby backing up interruption of the A.C. power supply.

Such an active filter can be realized by constructing a high-speed D.C. voltage control system so as to quicken the response of the storage battery voltage controller 311 thereby enabling a prompt suppression of fluctuation of the capacitor voltage. Obviously, this type of converter apparatus can be used in stabilizing a power transmission/distribution system.

Although in the described embodiment the storage battery 4 and the inverter 1A are used as the energy source and the converter, the same advantages are brought about when another A.C. power supply is used as the energy source while a cyclo-converter is used as the converter.

In the described embodiment, an arrangement is used in which the load BUS voltage command for suppressing the vibration of the A.C. source current $\hat{I}_B$ is obtained from the q-axis component of the current $\hat{I}_B$. The same advantages are derived also when this arrangement is substituted by another arrangement which detects the d-axis component of the current $\hat{I}_B$ in place of the q-axis component.

In a system in which the function for suppressing the vibration of the source current $\hat{I}_B$ is more significant than the function for maintaining a constant voltage of the load BUS line, it is advisable to use a pair of vibration suppressing circuit so as to feedback both the d- and q-axis components of the source current $\hat{I}_B$.

What is claimed is:

1. A 3-phase converter apparatus in which a 3-phase A.C. power supply and a 3-phase converter operate in parallel on a common load BUS so as to share load power, said apparatus comprising:

output voltage command generating means for generating an output voltage command of output voltage from the converter, said means computing an optimum phase deviation of a load BUS voltage from the A.C. power supply and determining the output voltage command in accordance with a computed value of the optimum phase deviation; and instantaneous voltage control means for controlling the converter so as to reduce deviation of the instantaneous value of the output voltage of the converter from the output voltage command generated by said output voltage command generating means.

2. A 3-phase converter apparatus according to claim 1, wherein said instantaneous voltage control means includes a major loop for conducting voltage control of the load BUS in accordance with a load BUS voltage command, and a minor loop for controlling output current of the converter in conformity with a current command, instantaneous voltage means providing, as the current command to be supplied to the minor loop, the sum of at least two out of three phase components of a current differential between a load current and a current from the A.C. power supply, and at least two out of three phase components of a current to be supplied by the converter for the purpose of eliminating deviation of the load BUS voltage from the load BUS voltage command.

3. A 3-phase converter apparatus according to claim 1, wherein said instantaneous voltage control means includes a major loop for conducting voltage control of the load BUS in accordance with a load BUS voltage command, and a minor loop for controlling output current of the converter in conformity with a current command, said instantaneous voltage control means providing, as the current command to be supplied to the minor loop, a sum of at least two mutually independent components formed by coordinate conversion of at least two out of three phase components of a current differential between a load current and a current from said A.C. power supply, and at least two mutually independent components formed by coordinate conversion of at least two out of three phase components of the current to be supplied by the converter for the purpose of eliminating deviation of the load BUS voltage from the load BUS voltage command.

4. A 3-phase converter apparatus according to claim 1, further comprising:

detecting means for detecting abnormalities in the A.C. power supply;

a switch for disconnecting the A.C. power supply from the load BUS;

energy storage means connected to the input side of the converter, said detecting means, upon detection of an abnormality in the A.C. power supply, turning said switch so as to disconnect said A.C. power supply from said load BUS, whereby power is supplied to the load from said energy storage means through the converter.

5. A 3-phase converter apparatus according to claim 4, wherein said energy storage means includes a storage battery, and said output voltage command generating means determines a phase of the output voltage command, when there is no abnormality in the A.C. power supply, in accordance with power required for charging the battery and power demanded by the load.

6. A 3-phase converter apparatus according to claim 4, wherein said energy storage means includes a capacitor and said output voltage command generating means determines a phase of the output voltage command in accordance with charging and discharging power necessary for maintaining capacitor voltage at a desired level.

7. A 3-phase converter apparatus according to claim 4, wherein said energy storage means includes a solar battery, and said output voltage command generating means changes a phase of the output voltage command in accordance with solar battery power so that an effective power of the load is shared by the A.C. power supply the solar battery.

8. A 3-phase converter apparatus according to claim 4, wherein said energy storage means includes a fuel cell and said output voltage command generating means changes a phase of the output voltage command in accordance with power from the fuel cell so that effective load power is shared by the A.C. power supply and the fuel battery.

9. A 3-phase converter apparatus according to claim 1, wherein said converter includes a cyclo-converter, an auxiliary A.C. power supply as energy storage means being connected to an input side of said cyclo-converter.

10. A 3-phase converter apparatus according to claim 1, wherein said converter is a 3-phase voltage type PWM inverter.

11. A 3-phase converter apparatus according to claim 1, wherein said converter is a high-frequency link type one including a combination of a voltage-type inverter and a cyclo-converter.

12. A 3-phase converter apparatus in which a 3-phase A.C. power supply and a 3-phase converter operates in parallel on a common load BUS so as to share load power, said apparatus comprising:

output voltage command generating means for generating an output voltage command from the converter by forming a signal by multiplying current of at least one phase of the 3-phase A.C. power supply with a transfer function having a resistance component in a power supply frequency region and subtracting the signal from a preset voltage command, said means computing an optimum phase deviation of a load BUS voltage from the A.C. power supply and determining the output voltage command in accordance with the computed optimum phase deviation; and instantaneous voltage control means for controlling the converter so as to reduce deviation of the instantaneous value of the output voltage of the converter from the output voltage command generated by said output voltage command generating means.

13. A 3-phase converter apparatus according to claim 12 wherein said instantaneous voltage control means includes a major loop for conducting the voltage control of the load bus in accordance with a load bus voltage command, and a minor loop for controlling output current of the converter in conformity with a current command;

said instantaneous voltage control means providing, as the current command to be supplied to the minor loop, the sum of at least two out of three phase components of the current differential between a load current and a current from the A.C. power supply, and at least two out of three phase components of a current to be supplied by the converter for the purpose of eliminating deviation of the load bus voltage from the load bus voltage command.

14. A 3-phase converter apparatus in which a 3-phase A.C. power supply and a 3-phase converter operate in parallel on a common load BUS so as to share load power, said apparatus comprising:

output voltage command generating means for generating an output voltage command from the converter by conducting a coordinate conversion so as to convert 3-phase A.C. power into two independent components, forming a signal by multiplying at least one of the components with a transfer function having a resistance component in a power supply frequency region, and subtracting the signal from a preset coordinate system voltage command after coordinate conversion; and instantaneous voltage control means for controlling the converter so as to reduce deviation of the instantaneous value of the output voltage of the converter from the output voltage command generated by said output voltage command generating means;

wherein said means for generating an output voltage command computes an optimum phase deviation of a load BUS voltage from the A.C. power supply and determines the output voltage command in accordance with the computed optimum phase deviation.

15. A 3-phase converter apparatus according to claim 14 wherein said instantaneous voltage control means includes a major loop for conducting voltage control of the load bus in accordance with a load bus voltage command, and a minor loop for controlling output current of the converter in conformity with a current command;

said instantaneous voltage control means providing, as the current command to be supplied to the minor loop, a sum of at least two mutually independent components formed by coordinate conversion of at least two out of three phase components of a current differential between a load current and a current from the A.C. power supply, and at least two mutually independent components formed by coordinate conversion of at least two out of three phase components of a current to be supplied by the converter for the purpose of eliminating deviation of the load bus voltage from the load bus voltage command.

* * * * *